United States Patent [19]

Hoks

[11] 4,066,547

[45] Jan. 3, 1978

[54] METHOD OF FEEDING MATERIAL FOR CENTRIFUGATION TO A CONTINUOUSLY OPERATING CENTRIFUGE, AND A CENTRIFUGE FOR PERFORMING THE METHOD

[75] Inventor: Dirk Hoks, Hengelo, Netherlands

[73] Assignee: Stork-Werkspoor Sugar B.V., Hengelo, Netherlands

[21] Appl. No.: 707,650

[22] Filed: July 22, 1976

[30] Foreign Application Priority Data

Aug. 15, 1975 Netherlands ........................ 7509783

[51] Int. Cl.$^2$ ........................ B01D 33/02; B04B 3/00

[52] U.S. Cl. ........................ 210/78; 210/377; 233/21; 233/40; 233/44

[58] Field of Search ............ 233/3, 21, 27, 40, 41–44; 210/78, 360 R, 369, 370, 371, 372, 373–375, 377, 378, 380, 381, 209–215

[56] References Cited

U.S. PATENT DOCUMENTS

| | | | |
|---|---|---|---|
| 2,708 | 7/1867 | Mackey | 210/377 |
| 1,187,584 | 6/1916 | Wendell | 210/377 |
| 1,565,605 | 12/1925 | Van Der Molen | 210/377 |
| 1,829,547 | 10/1931 | Sharples | 210/377 |
| 3,040,893 | 6/1962 | Schmiedel | 210/78 |
| 3,189,268 | 6/1965 | Nilsson | 233/27 |
| 3,606,147 | 9/1971 | Broadbent | 233/41 |
| 3,707,235 | 12/1972 | Talley | 210/377 |
| 3,737,038 | 6/1973 | Westfall | 210/377 |
| 3,775,311 | 11/1973 | Mook et al. | 210/78 |

*Primary Examiner*—Frank W. Lutter
*Assistant Examiner*—Frank Sever
*Attorney, Agent, or Firm*—John P. Snyder

[57] ABSTRACT

A method of feeding material for centrifugation to a continuously operating centrifuge having a conical drum, wherein the stream of material for centrifugation to be fed to the drum is divided up into $n$ sub-flows and the $n$ sub-flows are fed to $n$ axially consecutive annular sections of the drum surface, the sizes of the sub-flows fed to the annular sections per unit of length in the axial direction being in the same ratio as the squares of the average diameters of said annular sections and a centrifuge with a distributor system inside the drum for dividing the material into $n$ sub-flows.

7 Claims, 3 Drawing Figures

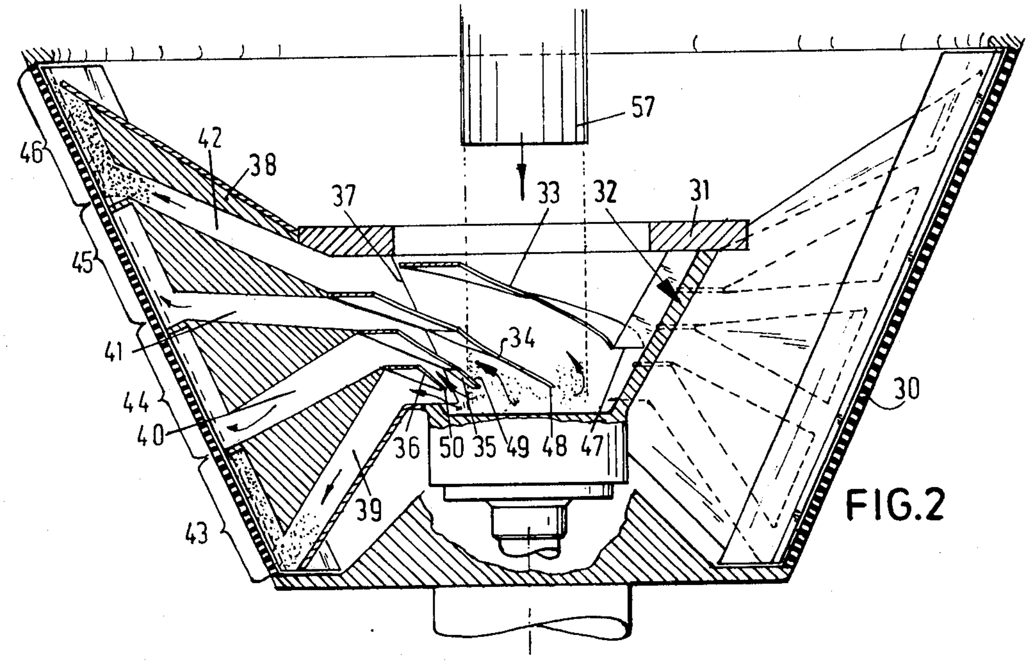
FIG.2
FIG.3
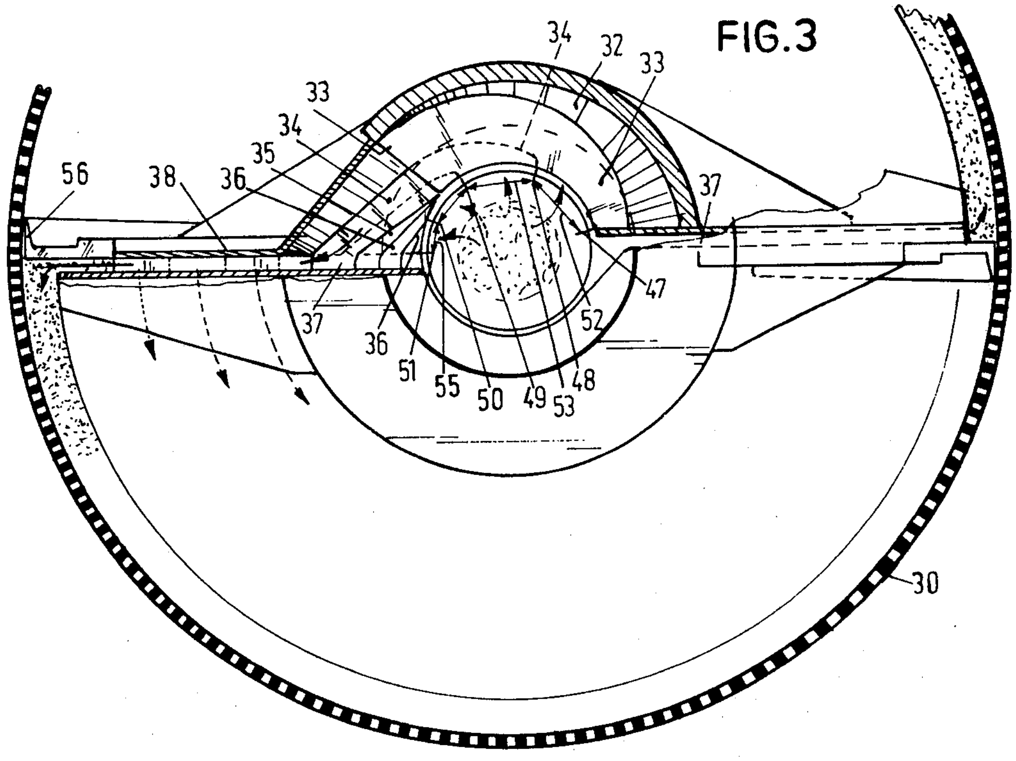

METHOD OF FEEDING MATERIAL FOR CENTRIFUGATION TO A CONTINUOUSLY OPERATING CENTRIFUGE, AND A CENTRIFUGE FOR PERFORMING THE METHOD

The invention relates to a method of feeding material for centrifugation to a continuously operating centrifuge having a conical drum. The problem arising in prior-art centrifuges of this type is that the quality of the centrifuged product is inhomogeneous. This is a result of the fact that when the material for centrifugation is fed, an unequal layer thickness forms, the maximum layer thickness occurring on the smallest diameter of the centrifuge drum. Against this, the maximum centrifugation effect occurs precisely at the place where the drum has the largest diameter.

The object of the invention is to provide a method to obviate this disadvantage and give a more homogeneous quality of the product.

According to the invention, the stream of material for centrifugation to be fed to the drum is divided up into $n$ sub-flows and the $n$ sub-flows are fed to $n$ axially consecutive annular sections of the drum surface, the sizes of the sub-flows fed to the annular sections per unit of length in the axial direction being in the same ratio as the squares of the average diameters of said annular sections. With such a method, as the centrifugation effect increases on part of the surface, so is more material for centrifugation supplied. The local layer thickness of the material for centrifugation is substantially proportional to the local drum diameter so that a very uniform quality is obtained for the product.

According to the invention, the annular sections have an equal height and the sizes of the sub-flows are in the same ratio to one another as the squares of the average diameters of said annular sections. Since the annular sections have an equal height, only one parameter has to be taken into account in determining the size of the sub-flows. Consequently it is a simple matter as regards design to obtain the correct distribution.

The invention also relates to a continuously operating centrifuge having a conical drum and a system for feeding material for centrifugation to the drum in the manner described hereinbefore.

According to the invention, a distributor system for the material for centrifugation is provided inside the drum and divides the material for centrifugation into $n$ sub-flows, a distributor arm extends over the entire height of the drum and is provided with one or more outlet apertures, connecting ducts are provided in the arm between the distributor system and the outlet apertures, said ducts each feeding one sub-flow to an annular zone of the drum surface, and the sizes of the $n$ sub-flows per unit of height of the associated annular zone are in the same ratio to one another as the squares of the average diameters of said annular zones.

In an advantageous embodiment of the centrifuge, the centrifuge is disposed vertically, the distributor system is formed by a body of revolution which is open at the top and widens out in the upward direction and is situated coaxially inside the drum, the wall of said body having at least two slot-like apertures spaced equally apart and extending over the entire height of the wall, the slots are divided into sections each communicating via a duct with an associated duct in the distributor arm connecting with an annular section of the drum surface, the annular sections having equal heights, baffles are formed against the upright wall of the distributor system and their end edges connect with the sections of the slot-like aperture and their leading edges are situated near the bottom edge of the upright wall, the peripheral spacing between the leading edges of the next baffles are in the same ratio to one another as the squares of the average diameters of the annular zones to which the associated baffles are connected, and a feed for the material for centrifugation leads centrally into the distributor system.

With such a construction of the centrifuge, the material for centrifugation fed centrally into the distributor system will immediately spread uniformly over the base of the body of revolution and be distributed along the wall thereof. The leading edges of the baffles divide the incoming material immediately into as many sub-flows as there are baffles and then the sub-flows will move along the baffles towards the associated ducts in the distributor arm. The material will then be fed to be different annular sections in the correct quantity.

According to the invention, the distributor arm is also provided with a scraper device, the distributor arm rotates at a slightly different speed from the centrifuge drum, the centrifuge is driven by a set of gears co-rotating with the centrifuge, more particularly a harmonic drive, the distributor system is driven by the output shaft of the set of gears and the input shaft of said set of gears is provided with its own drive system. With such a construction, the difference in speed between the distributor system and the centrifuge drum can very accurately be adjusted by altering the driving speed of the input shaft. It is thus possible very accurately to adjust the residence time of the product for centrifugation in the centrifuge drum. A construction of this kind is particularly important with a centrifuge in which the material is at rest on the wall of the centrifuge drum during centrifugation. As soon as the scraper system comes into contact with the centrifuged product the equilibrium of the centrifugal force on the product and the frictional force is distributed in favour of the centrifugal force acting along the scraper in the direction of the drum, so that as soon as the product comes into contact with the edge of the scraper it automatically is transported to the edge of the drum by the action of centrifugal force and is then hurled outwards over said edge.

The invention will be explained in detail in the following description of one exemplified embodiment with reference to the drawing wherein:

FIG. 2 is an axial section of a preferred embodiment of the centrifuge drum with a distributor system, FIG. 3 is a top plan view of the centrifuge drum and distributor system shown in FIG. 2.

Figure 1:
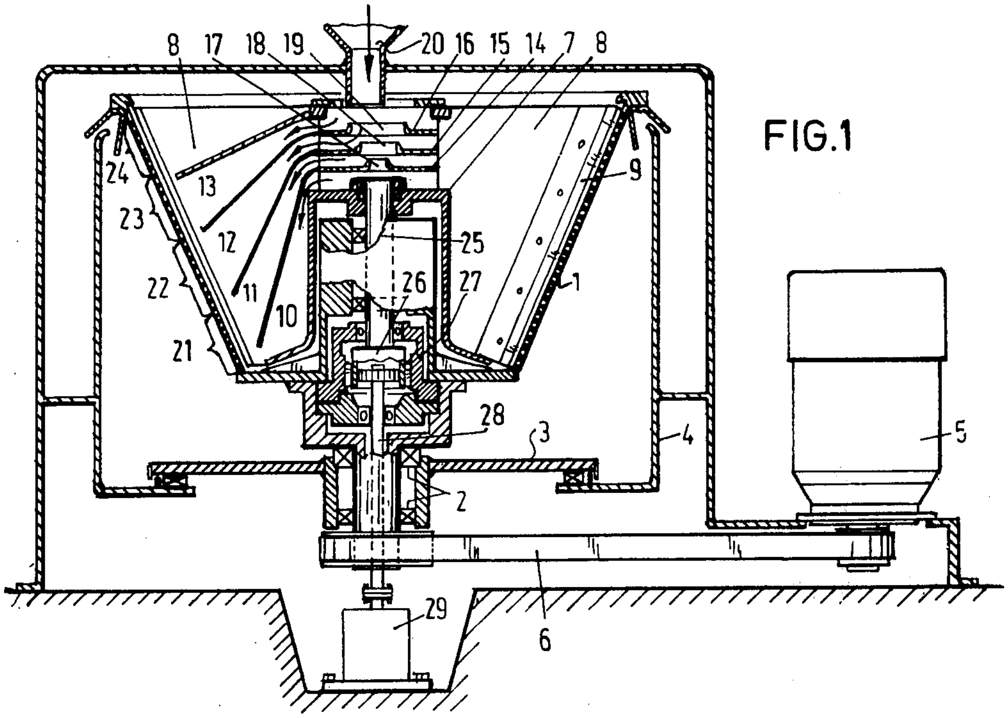
FIG. 1 is an axial section of a centrifuge.

The centrifuge shown in FIG. 1 consists of a perforate conical drum 1 mounted by bearings 2 in a part 3 which is resiliently supported in a casing 4. The drum is driven by a motor 5 through a belt transmission 6. A distributor device is disposed inside the drum and consists of a part 7 which is mounted for rotation with respect to the drum. Part 7 is provided with two diametrically opposite distributor arms 8 which bear a scraper device 9 and have on the other side outlet openings for the material for centrifugation. Ducts 10, 11, 12 and 13 are formed inside the distributor arms 8. These ducts connect with annular sections of the surface of the drum 1. A number of cups 14, 15 and 16 are provided at the end of the ducts situated near the drum centre-line and are provided with apertures 17, 18 and 19 respectively situated on the drum centre-line. Together with the top of the part 7, chambers connecting with the ducts 10, 11, 12 and 13 are formed between the cups 14, 15 and 16. The material for centrifugation can be fed via a feed pipe 20. The latter is situated eccentrically with respect to the apertures 17, 18 and 19. Apertures 17, 18 and 19 increase in size with ascending order of the cups so that the material fed via the pipe 20 reaches different cups and the top edge of the part 7, the quantity reaching the different cups being determined by the sizes of the apertures 17, 18 and 19 and the eccentricity of the pipe 20. Given a correct choice of the dimensions of the apertures and the location of the pipe, the quantities of material fed via the ducts 10, 11, 12 and 13 to the annular zones 21, 22, 23 and 24 will be in the same ratio to one another as the squares of the average diameters of said annular zones 21, 22, 23 and 24. Consequently, the maximum layer thickness occurs in zone 24, because in conjunction with the more intensive centrifugation the same quality product is obtained as, for example, in zone 21.

As will be apparent from FIG. 1, part 7 is borne by a shaft 25 connected to the resilient part 26 of a harmonic drive. The harmonic drive casing 27 is rigidly connected to the drum 1. The input shaft 28 is led out throught the hollow shaft of the drum 1 and provided with its own drive motor 29. As is known, there will be a very small transmission ratio between the part 7 bearing the distributor system, and the drum 1. This transmission ratio can be adjusted very accurately by changing the drive of shaft 28 by means of motor 29.

FIGS. 2 and 3 again show a perforate conical drum 30. The drum is driven in the same way as described in FIG. 1. A distributor system 31 is provided inside the drum 30 and is also driven in such a manner that there is a very small difference in speed with respect to the drum 30. The distributor system 31 consists of a pot which is open at the top and which is in the form of a body of revolution widening out in the upward direction. Guide blades 33, 34, 35 and 36 are provided against the wall 32. These guide blades jointly cover approximately half the circumference of the pot while a second set of guide blades is provided diametrically opposite on the other side of the pot.

Slot-like apertures 37 are formed in the wall 32, while part of the wall 32 is omitted adjacent the slot-like apertures 37. The conical part of the wall 32 adjoins the slot 30 via tangential surfaces. Slot 37 provides access to the space inside the distributor arm 38. Feed ducts 39, 40, 41 and 42 are formed by partitions inside the distributor arm. These feed ducts discharge to the annular zones 43, 44, 45 and 46, whose lengths are equal to the axial direction. The partitions 33, 34, 35 and 36 with the extension elements adjoin the ducts 42, 41, 40 and 39 respectively. The leading edges 47, 48, 49 and 50 are at some distance from the base of the pot 31. The leading edges 47, 48, 49 and 50 and the boundary edge 51 are so spaced peripherally that the arc lengths 52, 53, 54 and 55 are in the same ratio to one another as the squares of the average diameters of the annular zones 46, 45, 44 and 43. When the material for centrifugation is fed to the bottom of the pot 31 via the pipe 57 with the centrifuge drum and the distributor system rotating, the said material will try to move upwards uniformly along the oblique wall 32. It will be clear that as a result of the mutual location of the leading edges of the partitions 33, 34, 35 and 36, as explained hereinbefore, the material will immediately be divided up into sub-flows, which are also in the same ratio to one another as the squares of the average diameters of the annular zones 46, 45, 44 and 43. These sub-flows are guided into the ducts 42, 41, 40 and 39 by the guide blades 33, 34, 35 and 36. Under the influence of the centrifugal force, the sub-flows flow on in these ducts and the material is distributed over the annular zones 43, 44, 45 and 46. With the described ratio of the sub-flows to one another, there is here again a layer thickness of the material for centrifugation adapted to the centrifugation on the relevant part of the surface of the drum. FIG. 3 also shows how the material for centrifugation emerges at the rear of the distributor arm 38, while a scraper edge 56 is provided on the front. With the slow movement of the distributor arm 38 with respect to the drum 30, the residence time is determined by the time elapsing between the moment that a particle is fed to the drum surface and the moment that this particle is subsequently lifted from the inner surface of the drum by the scraper edge 56 of the next distributor arm 38. The distributor system as described is particularly suitable for use in a centrifugal drum of a conicity such that the material for centrifugation remains just at rest on the inner surface of the drum. Only when the scraper 56 transfers the material from the wall, will equilibrium be destroyed and the material transported to the drum edge under the influence of centrifugal force and then be hurled outwards over said edge. The material selected for the scraper 56 may, for example, be one having a very low coefficient of friction for the material under centrifugation. In that case, as soon as the material reaches the scraper 56, the friction is insufficient to retain the material, so that said material moves over the scraper towards the drum edge under the influence of centrifugal force.

What I claim is:

1. In a centrifuging method which comprises the steps of axially rotating a conical, perforate drum at a predetermined speed, and continuously feeding a stream of material to be centrifuged to the inner surface of said drum, the improvement which comprises:

distributing said feeding by plural distribution means which are vertically displaced one from the other; each of said distribution means comprising guide blade means and flow proportionating means; any one of said flow proportionating means functioning to provide a greater flow therethrough than any other of said flow proportionating means therebelow, such that consecutive annular sections of said inner surface of the drum, successively from the smaller end to the larger end of the drum, receive increasingly greater quantities of said stream of material, said quantities being related such that any two quantities are in the same ratio as the squares of the average diameters of their respective annular sections.

2. In a method as defined in claim 1 wherein each of said annular sections is of the same axial length.

3. A continuously operating centrifuge comprising, in combination:

a frusto-conical, perforate drum and means for rapidly rotating said drum about its logitudinal axis; and plural means for distributing a stream of material to be centrifuged into the interior of said drum, each of said means being vertically displaced one from the other, and each of said means for distributing comprising guide blade means and flow proportionating means; any one of said flow proportionating means functioning to provide a greater flow therethrough than any other of said flow proportionating means therebelow, so as to divide said stream into a plurality of sub-flows and directing each sub-flow to a respective annular section of the drum, said sub-flows being related in quantities such that the quantities of any two sub-flows are in the same ratio as the squares of the average diameters of their respective annular sections.

4. A continuously operating centrifuge as defined in claim 3 wherein said mechanism comprises a distributor arm rotatably mounted coaxially of said drum and having an outer end terminating in closely spaced relation with the inner surface of said drum and extending axially throughout such inner surface, said arm being hollow and having a discharge slot extending along said outer end thereof, means for channeling said sub-flows within said arm to discharge against successive annular sections of said drum through said discharge slot, and means for dividing said stream into said sub-flows within the channels in said arm.

5. A continuously operating centrifuge as defined in claim 4 including means for rotating said distributor arm at a speed slightly different from that of said drum.

6. A continuously operating centrifuge as defined in claim 5 including a scraper carried by said distributor arm for removing material built up on the inner surface of said drum.

7. A continuously operating centrifuge comprising, in combination:

a frusto-conical drum having a perforate wall;

drive means for rotating said drum about its longitudinal axis whereby material to be centrifuged which is discharged against any particular inner surface annular section of said wall is subjected to centrifugal force having a value unique to that annular section;

plural means for distributing a stream of material to be centrifuged into a plurality of sub-flows directed to successive inner surface annular sections of said wall such that progressively thicker layers of material build up on the inner surface of said wall from the smaller to the larger end of said drum, each of said means for distributing being vertically displaced one from the other and comprising guide blade means and flow proportionating means; and one of said flow proportionating means functioning to provide a greater flow therethrough than any other of said flow proportionating means therebelow, such that the material in all of said layers tends to be homogeneous; and means for continuously removing said layers to recover the homogeneous material.

* * * * *